(12) United States Patent
Obayashi et al.

(10) Patent No.: US 8,581,545 B2
(45) Date of Patent: Nov. 12, 2013

(54) POWER EXCHANGE SYSTEM

(75) Inventors: Kazuyoshi Obayashi, Chita-gun (JP); Akira Sakamoto, Obu (JP)

(73) Assignee: Denso Corporation, Kariya (JP)

( * ) Notice: Subject to any disclaimer, the term of this patent is extended or adjusted under 35 U.S.C. 154(b) by 267 days.

(21) Appl. No.: 13/252,746

(22) Filed: Oct. 4, 2011

(65) Prior Publication Data

US 2012/0086397 A1 Apr. 12, 2012

(30) Foreign Application Priority Data

Oct. 6, 2010 (JP) ................. 2010-226872

(51) Int. Cl.
*H02J 7/00* (2006.01)
*B60L 9/00* (2006.01)

(52) U.S. Cl.
USPC ............... 320/109; 320/104; 701/22

(58) Field of Classification Search
USPC .......................................... 320/109
See application file for complete search history.

(56) References Cited

U.S. PATENT DOCUMENTS

| 5,596,258 A * | 1/1997 | Kimura et al. ............ 320/163 |
| 6,456,041 B1 * | 9/2002 | Terada et al. ............ 320/132 |
| 2008/0051949 A1 * | 2/2008 | Seo et al. ............ 701/22 |
| 2009/0040068 A1 * | 2/2009 | Oyobe et al. ............ 340/932.2 |
| 2010/0065344 A1 * | 3/2010 | Collings, III ............ 180/2.1 |

FOREIGN PATENT DOCUMENTS

| JP | A-10-094252 | 4/1998 |
| JP | A-11-178234 | 7/1999 |
| JP | A-2001-008380 | 1/2001 |
| JP | A-2001-202238 | 7/2001 |
| JP | A-2002-510957 | 4/2002 |
| JP | A-2002-315193 | 10/2002 |
| JP | A-2007-330083 | 12/2007 |
| JP | A-2008-182851 | 8/2008 |
| JP | A-2010-098793 | 4/2010 |

* cited by examiner

*Primary Examiner* — M'Baye Diao
(74) *Attorney, Agent, or Firm* — Oliff & Berridge, PLC

(57) ABSTRACT

A power exchange system for exchanging power between a power supply system of an installation and a battery of a vehicle includes an installation-side charger/discharger, a vehicle-side charger/discharger coupled to the installation-side charger/discharger to exchange the power, and a vehicle-side controller having a determination section and a setting section. The determination section determines whether the installation is equipped with an installation-side controller that controls power distribution in the power supply system. The setting section sets one of the installation-side controller and the vehicle-side controller as a power command center based on a result of determination by the determination section. The power command center commands one of the installation-side charger/discharger and the vehicle-side charger/discharger to charge/discharge the battery based on information of the battery and information of the power supply system.

12 Claims, 9 Drawing Sheets

FIG. 3

| MODE | CHARGE METHOD | PRIMARY CHARGER/DISCHARGER | CONNECTION | SECONDARY CHARGER/DISCHARGER |
|---|---|---|---|---|
| CM1 | NORMAL CHARGE | AC→AC (NO CONVERSION) | AC | AC→(AC/DC)→DC |
| CM2 | FAST DC CHARGE | AC→(AC/DC)→DC | DC | DC→DC (NO CONVERSION) |
| CM3 | FAST AC CHARGE | AC→AC (NO CONVERSION) | AC | AC→(AC/DC)→DC |
| CM4 | CONTACTLESS CHARGE | AC→(AC/HF)→HF | HF | HF→(HF/DC)→DC |
| CM5 | NORMAL CHARGE (TWO-WAY) | AC⇔AC (NO CONVERSION) | AC | AC⇔(AC/DC)⇔DC |
| CM6 | FAST DC CHARGE (TWO-WAY) | AC⇔(AC/DC)⇔DC | DC | DC⇔DC (NO CONVERSION) |
| CM7 | FAST AC CHARGE (TWO-WAY) | AC⇔AC (NO CONVERSION) | AC | AC⇔(AC/DC)⇔DC |
| CM8 | CONTACTLESS CHARGE (TWO-WAY) | AC⇔(AC/HF)⇔HF | HF | HF⇔(HF/DC)⇔DC |
| CM9 | DC CHARGE α (DC PS, TWO-WAY) | DC⇔(DC/DC)⇔DC | DC | DC⇔DC (NO CONVERSION) |
| CM10 | DC CHARGE β (DC PS, TWO-WAY) | DC⇔DC (NO CONVERSION) | DC | DC⇔(DC/DC)⇔DC |
| CM11 | CONTACTLESS CHARGE (DC PS, TWO-WAY) | DC⇔(DC/HF)⇔HF | HF | HF⇔(HF/DC)⇔DC |

FIG. 5

| HOME \ VEHICLE | OM1 | OM2 |
|---|---|---|
| WITH HEMS | ·Schedule<br>·Ecom<br>  HEMS ⇒ Pcom(t) | VEHICLE ⇒ Pcom |
| NO HEMS | ·Schedule<br>·Ecom<br>  VEHICLE ⇒ Pcom(t) | VEHICLE ⇒ Pcom |

POWER EXCHANGE SYSTEM

CROSS REFERENCE TO RELATED APPLICATION

This application is based on and claims priority to Japanese Patent Application No. 2010-226872 filed on Oct. 6, 2010, the contents of which are incorporated herein by reference.

TECHNICAL FIELD

The present invention relates to a power exchange system for managing an exchange of electric power between an installation (e.g., home or building) and a vehicle.

BACKGROUND

JP-A-2007-330083 discloses a power exchange system for performing an exchange of power between a home and an electric vehicle.

The home is equipped with a charger/discharger for charging/discharging a battery of the vehicle and a controller for controlling the charger/discharger. The controller controls the charger/discharger so that the vehicle battery can be charged at night when electricity is cheaper than during the day.

Further, the controller controls the charger/discharger so that the vehicle battery can be discharged to supply power to the home during a power outage or shortage. For the purpose of safety, when a user is absent, the controller prevents the charger/discharger from charging and discharging the vehicle battery. Further, the controller controls the charger/discharger based on the target energy for the battery and the remaining energy in the battery so that power consumption in electrical appliances in the home can be leveled out.

In the conventional system disclosed in JP-A-2007-330083, since the vehicle is not equipped with a controller for controlling the charge/discharge of the vehicle battery, it is impossible for the vehicle-side to cause the home-side to charge/discharge the vehicle battery in response to a charge/discharge request occurring in the vehicle-side.

Further, the conventional system cannot be used, if the home is not equipped with the controller.

That is, the conventional system can be used to charge/discharge the vehicle battery, only when the home is equipped with the controller and the charger/discharger. Therefore, the conventional system lacks versatility.

SUMMARY

In view of the above, it is an object of the present invention to provide a power exchange system having an universal interface for allowing an exchange of power between an installation and a vehicle.

According to an aspect of the present invention, a power exchange system manages an exchange of power between a power supply system of an installation and a battery of a vehicle. The power exchange system includes an installation-side charger/discharger provided in the installation, a vehicle-side charger/discharger provided in the vehicle and coupled to the installation-side charger/discharger to exchange the power between the power supply system and the battery, and a vehicle-side controller provided in the vehicle and configured to receive battery information regarding the battery. The vehicle-side controller has a determination section and a setting section. The determination section determines whether the installation is equipped with an installation-side controller that controls power distribution in the power supply system. The setting section sets one of the installation-side controller and the vehicle-side controller as a power command center based on a result of determination by the determination section. The power command center commands one of the installation-side charger/discharger and the vehicle-side charger/discharger to charge/discharge the battery based on the battery information and installation-side information regarding the power supply system.

BRIEF DESCRIPTION OF THE DRAWINGS

The above and other objects, features, and advantages will become more apparent from the following description and drawings in which like reference numerals depict like elements. In the drawings:

FIG. 3 is a diagram illustrating power conversion modes of a primary charger/discharger and a secondary charger/discharger;

FIG. 5 is a diagram illustrating an operation mode of the vehicle ECU;

DETAILED DESCRIPTION OF THE PREFERRED EMBODIMENT

A power exchange system according to an embodiment of the present invention is described below with reference to FIGS. 1-3.

Figure 1:
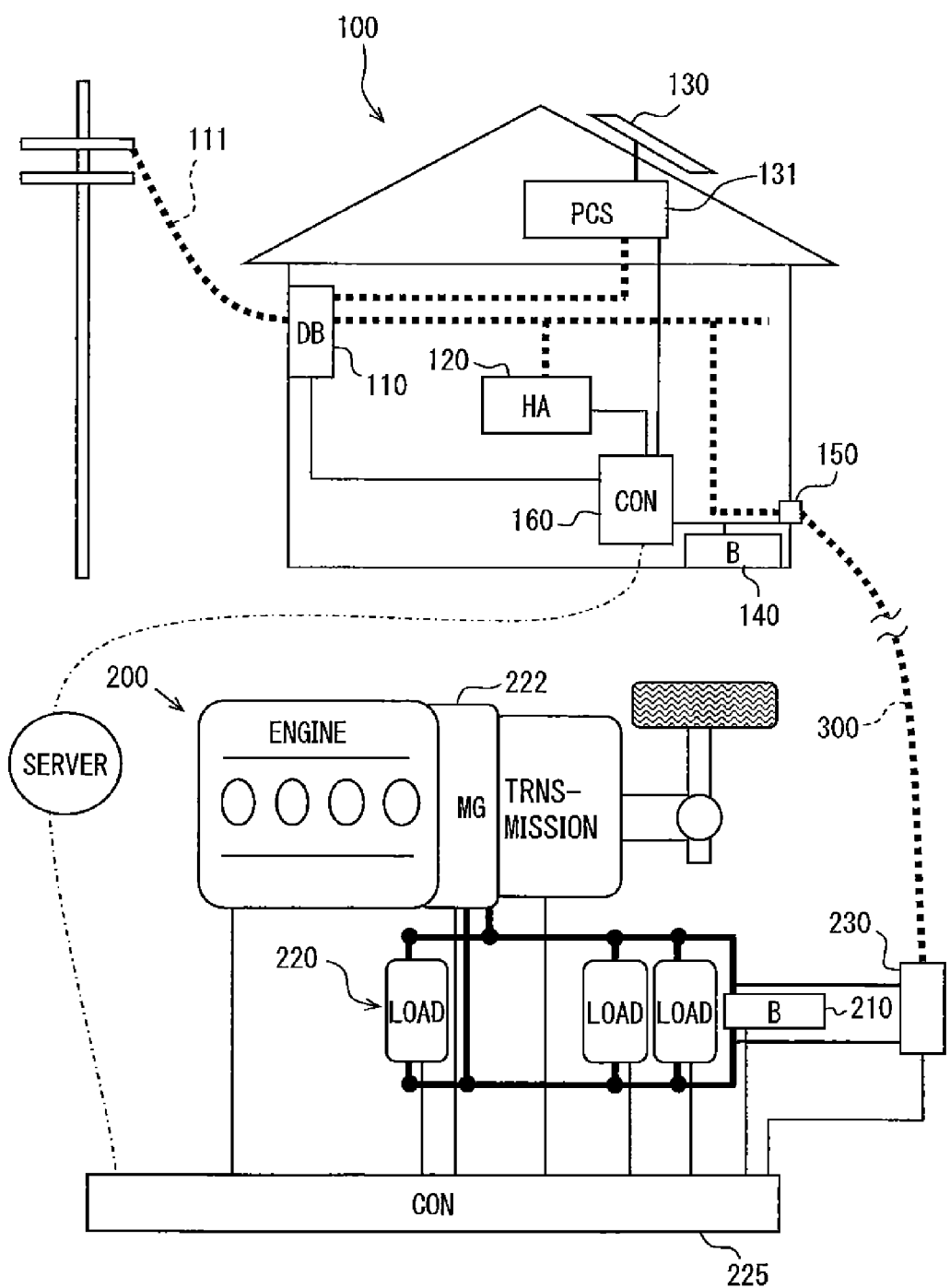
FIG. 1 is a diagram illustrating a power exchange system according to an embodiment of the present invention.
Figure 2:
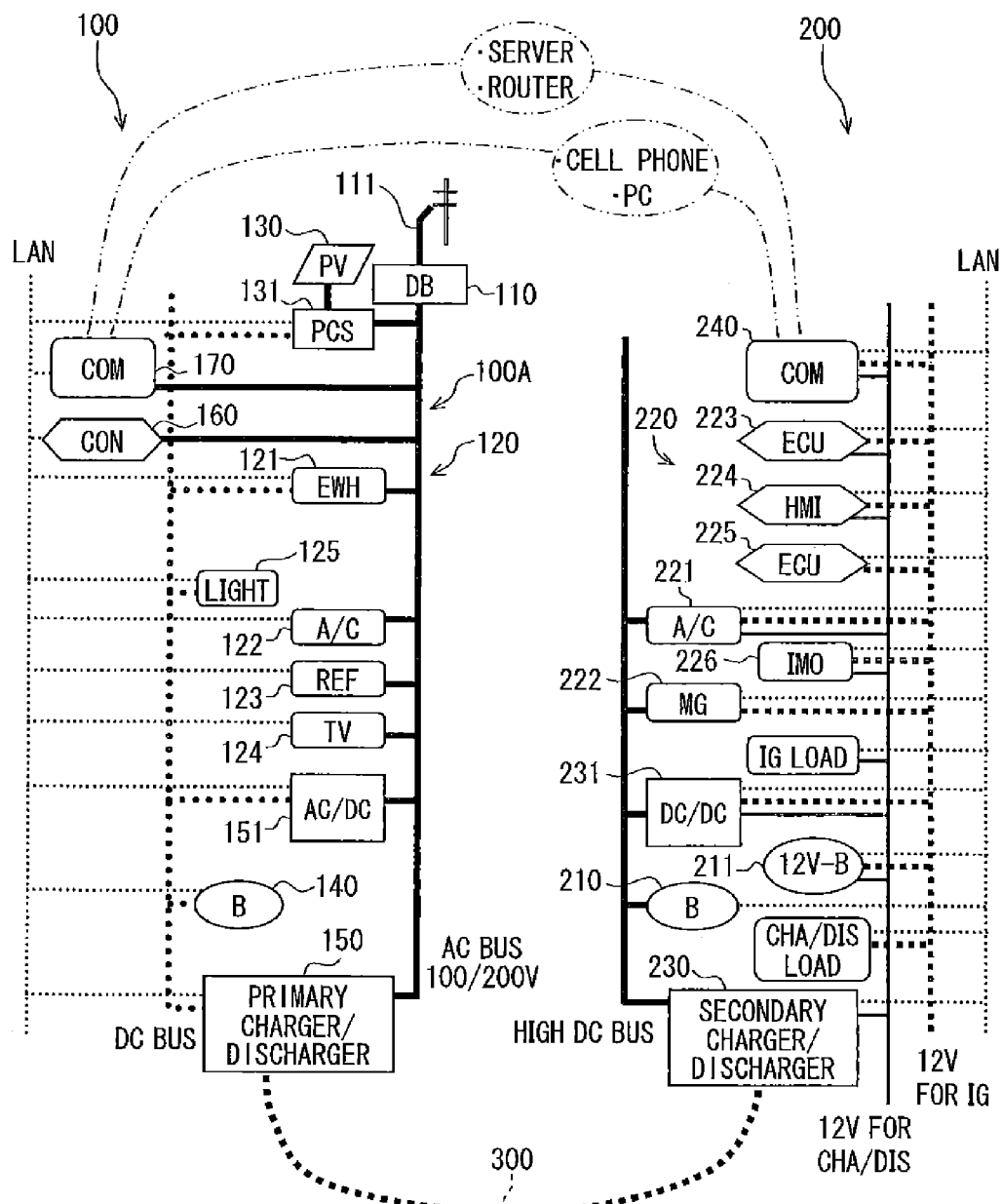
FIG. 2 is a diagram illustrating a detailed view of the power exchange system according to the embodiment.

As shown in FIGS. 1 and 2, the power exchange system manages an exchange of electric power between an installation 100 and a vehicle 200. For example, the installation 100 can be a typical home (hereinafter called the "home 100"). The home 100 is equipped with a distribution board 110, a home appliance 120, a photovoltaic unit 130, a main battery 140, a primary charger/discharger 150, a home-side controller 160, and a communication module 170.

The distribution board 110 distributes commercial utility power (i.e., AC power) supplied from a wire 111 to the home appliance 120 and the like. For example, the home appliance 120 can include an electric water heater 121, a home air conditioner 122, a refrigerator 123, a television set 124, and a lighting apparatus 125. For example, the electric water heater 121 can be the "EcoCute", which is a registered trademark of Kansai Electric Power Company in Japan. The "EcoCute" is an energy efficient electric heat pump and uses heat extracted from the air to heat water. The EcoCute uses carbon dioxide ($CO_2$) as a refrigerant.

The photovoltaic unit 130 generates electric power (i.e., DC power) by converting solar energy directly into electric energy by using solar batteries. The DC power generated by the photovoltaic unit 130 is converted into AC power by a power conditioner 131, and then the AC power is supplied to the home appliance 120. Further, the DC power generated by the photovoltaic unit 130 can be supplied to the main battery 140 through the power conditioner 131 without being converted into the AC power. The lighting apparatus 125 can be illuminated by the DC power stored in the main battery 140. The electric water heater 121 can be activated by not only the commercial utility power from the distribution board 110 but also the DC power stored in the main battery 140. An AC/DC power converter 151 is connected between a home-side AC power line (i.e., AC bus) and a home-side DC power line (i.e., DC bus) so that power can be exchanged between the AC power line and the DC power line.

In order to exchange power with a secondary charger/discharger 230 of the vehicle 200, the primary charger/discharger 150 performs power conversion when power (commercial utility power, generated power (AC power), DC power stored in the main battery 140) is supplied from the home 100 to the vehicle 200 or when power is supplied from the vehicle 200 to the home 100.

The primary charger/discharger 150 performs the power conversion in the following manner, when power is supplied from the home 100 to the vehicle 200. For example, the primary charger/discharger 150 can have at least one of charge/discharge modes CM1-CM11 shown in FIG. 3. In the first mode CM1 (normal charge), the primary charger/discharger 150 supplies commercial utility power to the vehicle 200 without conversion. In the second mode CM2 (fast DC charge), the primary charger/discharger 150 converts commercial utility power into DC power and supplies the DC power to the vehicle 200. In the third mode CM3 (fast AC charge), the primary charger/discharger 150 supplies commercial utility power to the vehicle 200 without conversion. In the fourth mode CM4 (contactless charge), the primary charger/discharger 150 converts commercial utility power into high frequency (HF) power and supplies the HF power to the vehicle 200 by an inductive charging method. In the ninth mode CM9 (two-way DC charge a from DC power source), the primary charger/discharger 150 DC-DC converts DC power stored in the main battery 140 and supplies the converted DC power to the vehicle 200. In the tenth mode CM10 (two-way DC charge β from DC power source), the primary charger/discharger 150 DC-DC converts supplies DC power stored in the main battery 140 to the vehicle 200 without conversion. In the eleventh mode CM11 (two-way contactless charge from a DC power source), the primary charger/discharger 150 converts DC power stored in the main battery 140 into HF power and supplies the HF power to the vehicle 200 by an inductive charging method. The fifth to eighth modes CM5-CM8 are for two-way charge and correspond to the respective modes CM1-CM4. When power is supplied from the vehicle 200 to the home 100, the primary charger/discharger 150 uses at least one of the two-way charge modes CM5-CM11 and performs the power conversion in an opposite manner compared to when power is supplied from the home 100 to the vehicle 200.

The home-side controller 160 effectively controls the electric water heater 121, the photovoltaic unit 130, and the primary charger/discharger 150 so that power exchange can be economically performed to meet the needs of a user. The home-side controller 160 controls power distribution in a power supply system 100A as described in detain later. The home-side controller 160 is connected through a local area network (LAN) to the home appliance 120, the photovoltaic unit 130, the main battery 140, the primary charger/discharger 150, and the communication module 170 so that a so-called home energy management system (HEMS) can be constructed.

The distribution board 110, the photovoltaic unit 130, the main battery 140, and the home-side controller 160 construct the power supply system 100A for supplying power to the home 100 and the vehicle 200. The home appliance 120 serves as an electric load activated by power supplied from the power supply system 100A.

The communication module 170 communicates with a communication module 240 of the vehicle 200 by a wired or wireless connection to exchange information regarding the home 100 and the vehicle 200 with the communication module 240. In the case of a wired connection, the communication module 170 can communicate with the communication module 240 through a signal line, for example, by a power line communication (PLC), a controller area network (CAN) communication, or a control pilot communication. In the case of a wireless communication, the communication module 170 can wirelessly communicate with the communication module 240 directly or indirectly through a router or a server run by a third party, for example, by a 3G wireless communication, a Wi-Fi communication, a ZigBee communication, a Bluetooth communication, or a dedicated short-range communication (DSRC).

For example, the vehicle 200 can be a hybrid vehicle. The vehicle 200 uses an engine and a motor generator (MG) 222 as power sources to move the vehicle 200. The vehicle 200 is provided with a battery 210, a 12V-battery 211, an on-board apparatus 220, a secondary charger/discharger 230, and the communication module 240.

The battery 210 is a storage battery rated at a high voltage (e.g., 200 volts). The 12V-battery 211 is a typical vehicle battery rated at 12 volts. For example, the on-board apparatus 220 can include a vehicle air conditioner 221, the motor generator 222, a power supply electronic control unit (ECU) 223, an input section 224, a vehicle ECU 225, and an immobilizer 226. The vehicle air conditioner 221 (mainly, a compressor in a refrigeration cycle) and the motor generator 222 are connected to and powered by the battery 210. The motor generator 222 is supplied with power from the battery 210 and acts as a motor to move the vehicle 200. Further, the motor generator 222 is driven by rotation of wheels of the vehicle 200 and acts as a generator to generate electric power during deceleration of the vehicle 200. The power generated by the motor generator 222 is stored in the battery 210.

The vehicle air conditioner 221 (mainly, a fan), the power supply ECU 223, an input section 224, the vehicle ECU 225, and the immobilizer 226 are connected the 12V-battery and powered by the 12V-battery 211. Further, an electric load is applied to the 12V-battery 211 during ignition and during charge/discharge.

The input section 224 is an input interface through which a user can input information including a charge request to charge the battery 210, a travel route, and a pre-air conditioning schedule. For example, the input section 224 can be provided as a special input panel (Human Machine Interface=HMI), a display of a navigation system, or a panel of the vehicle air conditioner 221. The vehicle ECU 225 serves as a vehicle-side controller and controls the engine, the motor generator 222, the vehicle air conditioner 221, and the immobilizer 226. A DC/DC power converter 231 is connected between a first DC power line (i.e., high voltage DC bus) of the battery 210 and a second DC power line (i.e., 12V DC bus) of the 12V-battery 211 so that power can be exchanged between the first DC power line and the second DC power line.

In order to exchange power with the primary charger/discharger 150 of the home 100, the secondary charger/discharger 230 performs power conversion when power (DC power stored in the battery 210) is supplied from the vehicle 200 to the home 100 or when power is supplied from the home 100 to the vehicle 200.

The secondary charger/discharger 230 performs the power conversion in the following manner, when power is supplied from the home 100 to the vehicle 200. For example, the secondary charger/discharger 230 can have at least one of the charge/discharge modes CM1-CM11 shown in FIG. 3. In the first mode CM1, the secondary charger/discharger 230 converts commercial utility power, which is received from the home 100, into DC power and supplies the DC power to the vehicle 200. In the second mode CM2, the secondary charger/discharger 230 receives DC power, into which the primary charger/discharger 150 of the home 100 converts commercial utility power, from the home 100 and supplies the DC power to the vehicle 200 without conversion. In the third mode CM3, the secondary charger/discharger 230 converts commercial utility power, which is received from the home 100, into DC power and supplies the DC power to the vehicle 200. In the fourth mode CM4, the secondary charger/discharger 230 receives high frequency (HF) power, into which the primary charger/discharger 150 of the home 100 converts commercial utility power, from the home 100, converts the HF power into DC power, and then supplies the DC power to the vehicle 200. In the ninth mode CM9, the secondary charger/discharger 230 receives DC power, which is stored in the main battery 140 of the home 100, from the home 100 and supplies the DC power to the vehicle 200 without conversion. In the tenth mode CM10, the secondary charger/discharger 230 receives DC power, which is stored in the main battery 140 of the home 100, from the home 100, DC-DC converts the DC power, and supplies the converted DC power to the vehicle 200. In the eleventh mode CM11, the secondary charger/discharger 230 receives HF power, into which the primary charger/discharger 150 of the home 100 converts DC power stored in the main batter 140 of the home 100, from the home 100, converts the HF power into DC power, and then supplies the DC power to the vehicle 200. The fifth to eighth modes CM5-CM8 are for two-way charge and correspond to the respective modes CM1-CM4. When power is supplied from the vehicle 200 to the home 100, the secondary charger/discharger 230 uses at least one of the two-way charge modes CM5-CM11 and performs the power conversion in an opposite manner compared to when power is supplied from the home 100 to the vehicle 200.

The communication module 240 is configured in the same manner as the communication module 170 of the home 100 and communicates with the communication module 170 by a wired or wireless connection to exchange information regarding the home 100 and the vehicle 200 with the communication module 170.

When power is exchanged between the home 100 and the vehicle 200, the primary charger/discharger 150 and the secondary charger/discharger 230 are connected by a power exchange line 300. For example, the power exchange line 300 can be a wired channel, such as a power cable, or a wireless channel, such as produced by an inductive charge method.

The power exchange between the home 100 and the vehicle 200 is described in detail below with further reference to FIGS. 4-9.

Figure 4:
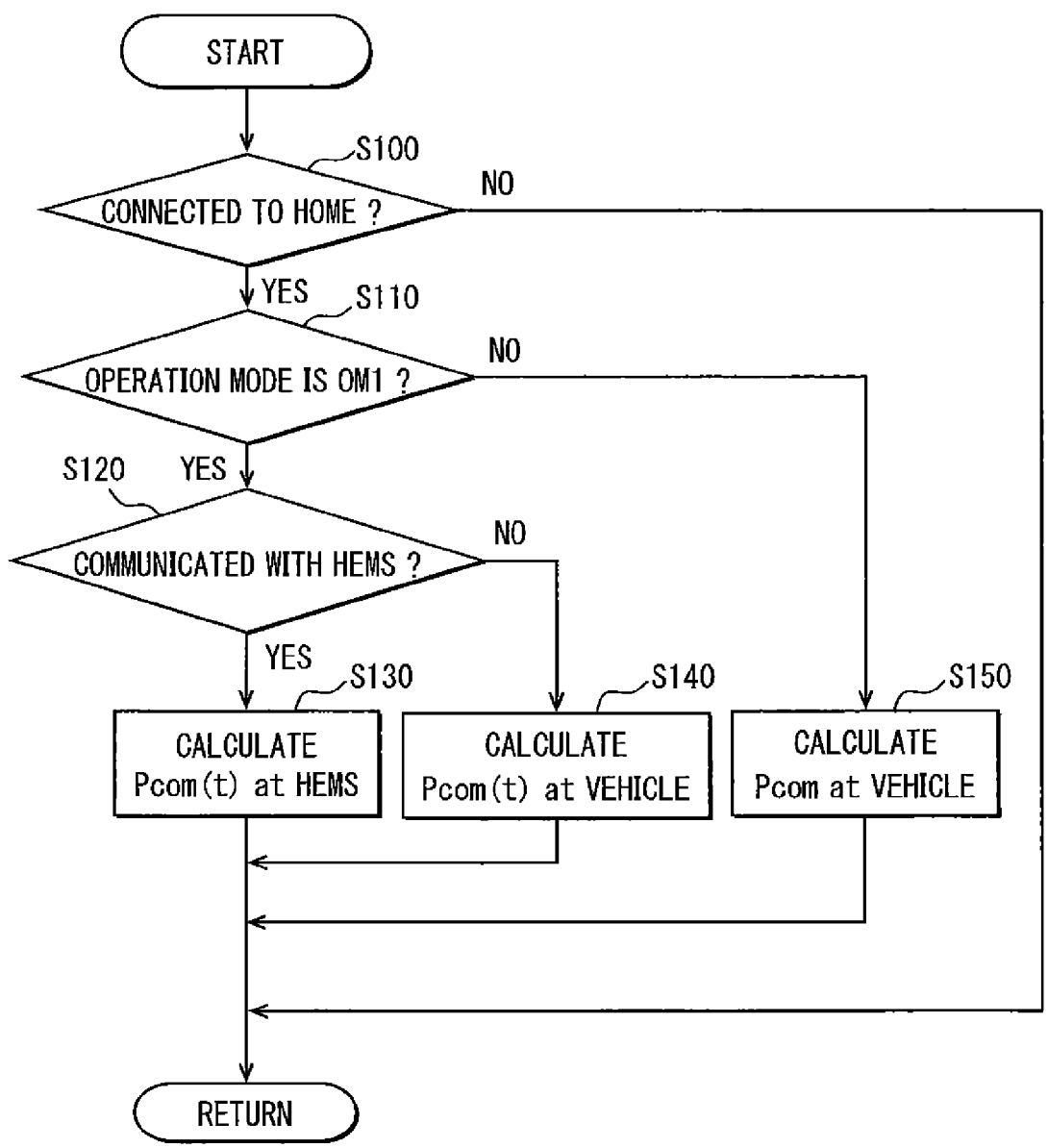
FIG. 4 is a diagram illustrating a process executed by a vehicle ECU when power is exchanged between a home and a vehicle.

FIG. 4 is a flow chart illustrating a control process executed by the vehicle ECU 225 when an interrupt occurs in the vehicle ECU 225. The control process starts at S100, where the vehicle ECU 225 determines whether the home 100 and the vehicle 200 are connected by the power exchange line 300. If the vehicle ECU 225 determines that the home 100 and the vehicle 200 are connected by the power exchange line 300 corresponding to YES at S100, the control process proceeds to S110. At S110, the vehicle ECU 225 determines whether an operation mode of the vehicle ECU 225 is a first mode OM1 or a second mode OM2. The first mode OM1 is used to output a first command for charging the battery 210 to a predetermined target energy level by a predetermined target time. On the other hand, the second mode OM2 is used to output a second command for charging the battery 210 at a predetermined physical value such as power, voltage, or current. If the vehicle ECU 225 determines that the operation mode is the first mode OM1 corresponding to YES at step S110, the control process proceeds to S120. In contrast, if the vehicle ECU 225 determines that the operation mode is the second mode OM2 corresponding to NO at step S110, the control process proceeds to S150.

At S120, the vehicle ECU 225 determines whether the home 100 is equipped with the home-side controller 160 by determining whether there is a communication with the HEMS of the home 100. If the vehicle ECU 225 determines that the home 100 is equipped with the home-side controller 160 corresponding to YES at S120, the control process proceeds to S130. In contrast, if the vehicle ECU 225 determines that the home 100 is not equipped with the home-side controller 160 corresponding to NO at S120, the control process proceeds to S140.

According to the embodiment, the home 100 and the vehicle 200 exchange information with each other by using the communication modules 170, 240. Therefore, at S120, the vehicle ECU 225 determines that there is a communication with the HEMS, and the control process proceeds to S130. In contrast, assuming that the home 100 is not equipped with the home-side controller 160, the vehicle 200 is connected to the home 100 through the power exchange line 300 inserted in a typical outlet of the home 100 for commercial utility power, for example. In such a case, the vehicle ECU 225 cannot confirm that there a communication with the HEMS. Therefore, at S120, the vehicle ECU 225 determines that there is no communication with the HEMS, and the control process proceeds to S140.

In this way, when the vehicle ECU 225 executes step S120, the vehicle ECU 225 serves as a determination section for determining whether the home 100 is equipped with the home-side controller 160. As described later, when the vehicle ECU 225 executes step S130 or S140, the vehicle ECU 225 serves as a setting section for setting one of the home-side controller 160 and the vehicle ECU 225 as a power command center 1A or 1B.

At S130 (Mode OM1 with HEMS in FIG. 5), the vehicle ECU 225 sets the home-side controller 160 as the power command center 1A. In this case, the home-side controller 160 acquires the charge request, including a target energy level SOCtarget and a target completion time Schedule, from a HMI information acquisition section 2. Then, the home-side controller 160 creates a charge/discharge plan Pcom(t) based on the charge request. Then, the home-side controller 160 commands one of the primary charger/discharger 150 and the secondary charger/discharger 230 to charge/discharge the battery 210 according to the charge/discharge plan Pcom(t) so that the battery 210 can be charged to the target energy level SOCtarget by the target completion time Schedule.

At S140 (Mode OM1 without HEMS in FIG. 5), the vehicle ECU 225 sets the vehicle ECU 225 itself as the power command center 1A. In this case, the vehicle ECU 225 acquires the charge request, including the target energy level SOCtarget and the target completion time Schedule, from the HMI information acquisition section 2. Then, the vehicle ECU 225 creates the charge/discharge plan Pcom(t) based on the charge request. Then, the vehicle ECU 225 commands one of the primary charger/discharger 150 and the secondary charger/discharger 230 to charge/discharge the battery 210 according to the charge/discharge plan Pcom(t) so that the battery 210 can be charged to the target energy level SOCtarget by the target completion time Tcom.

At S150 (Mode OM2 in FIG. 5), the vehicle ECU 225 sets the vehicle ECU 225 itself as the power command center 1B. In this case, the vehicle ECU 225 commands one of the primary charger/discharger 150 and the secondary charger/discharger 230 to charge/discharge the battery 210 at a power Pcom.

Steps S130, S140, and S150 are described in detail below.

Figure 6:
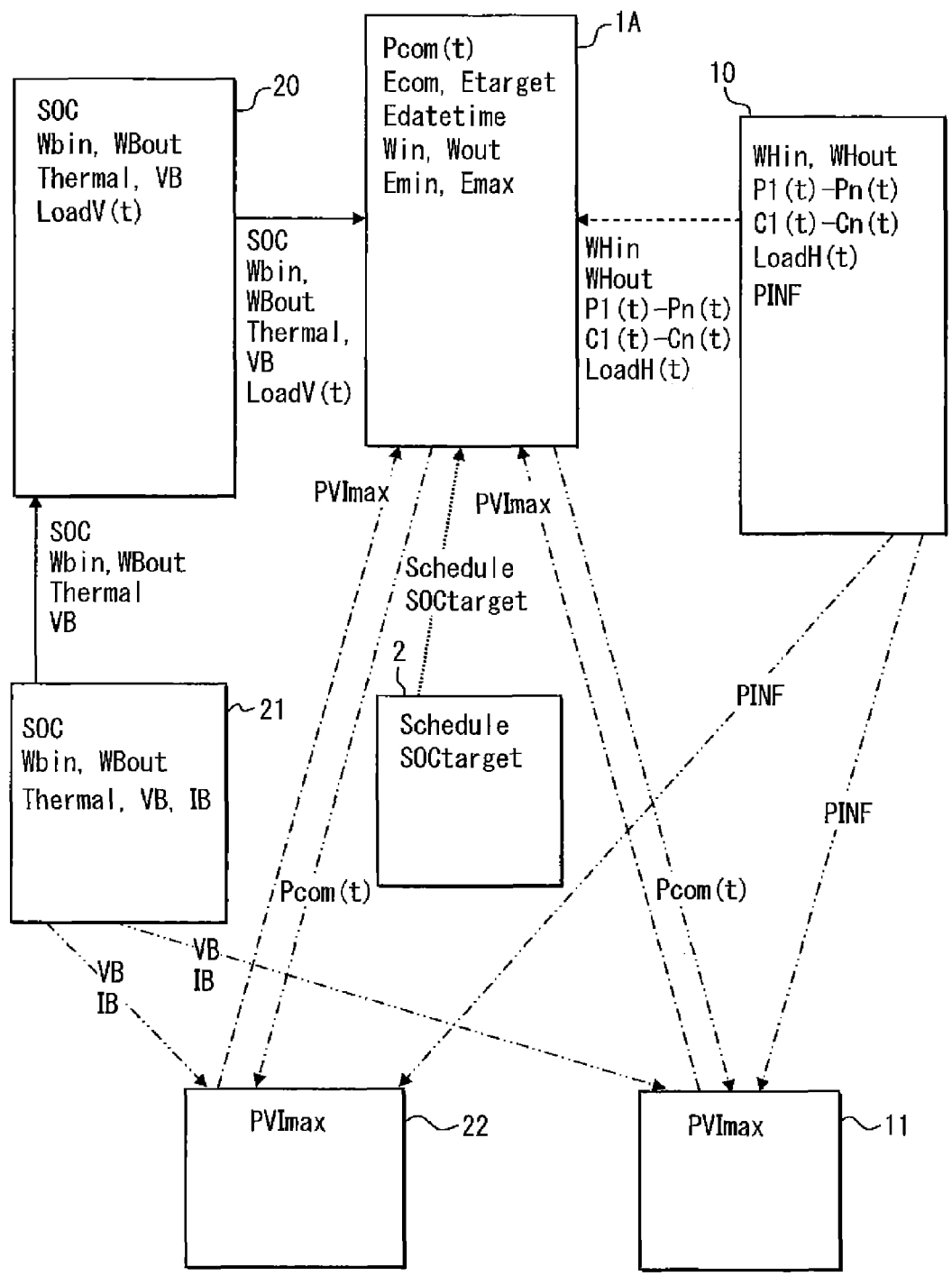
FIG. 6 is a diagram illustrating each function of the home and the vehicle in a first operation mode of FIG. 5.
Figure 7:
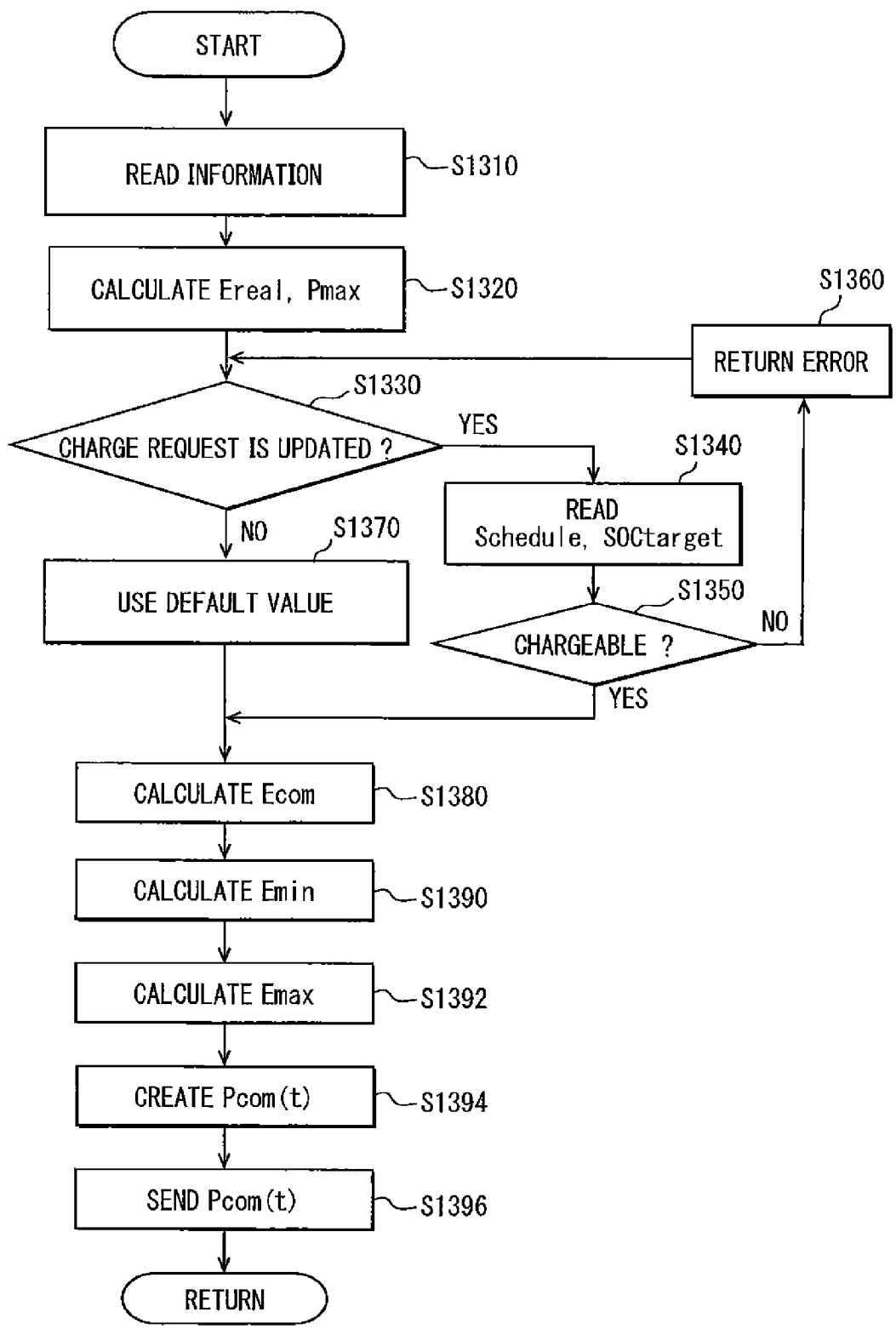
FIG. 7 is a diagram illustrating a process performed at step S130 (S140) of FIG. 4.

Firstly, step S130 is described with reference to FIGS. 6 and 7. FIG. 6 is a diagram illustrating each function of the home 100 and the vehicle 200 at step S130. FIG. 7 illustrates a first charge/discharge process executed at S130.

As mentioned above, step S130 is executed when the first mode OM1 is set as the operation mode, and the home 100 is equipped with the HEMS. In this case, the power command center 1A is provided to the home-side controller 160. Further, a HEMS information acquisition section 10 is provided to the home-side controller 160. A vehicle charge/discharge controller 20 and a battery information acquisition section 21 are provided to the vehicle ECU 225. A first information memory 11 for storing a conversion rating PVImax of the primary charger/discharger 150 is provided to the primary charger/discharger 150. A second information memory 22 for storing a conversion rating PVImax of the secondary charger/discharger 230 is provided to the secondary charger/discharger 230.

The HEMS information acquisition section 10 acquires home-side power information. The home-side power information includes a chargeable power WHin, a dischargeable power WHout, power profiles P1($t$)-Pn(t) for each supply power (e.g., commercial utility power, photovoltaic power, and battery power), cost profiles C1($t$)-Cn(t) for each supply power, a load profile LoadH(t), and a power supply information PINF of the power supply system 100A that is connected to the primary charger/discharger 150. The chargeable power WHin and the dischargeable power WHout depend on the power supply system 100A and a cable capacitance. For example, when a power supply of the power supply system 100A is a commercial AC system, the power supply information PINF can include a voltage V, a current I, and a frequency F. In contrast, when the power supply of the power supply system 100A is a DC power source, the power supply information PINF can include a voltage VB1 and a current IB1.

The vehicle charge/discharge controller 20 receives battery information from the battery information acquisition section 21. The battery information can include a state of charge (SOC), a chargeable power WBin, a dischargeable power WBout, a temperature Thermal, a voltage VB, and a current IB of the battery 210. Further, the vehicle charge/discharge controller 20 receives a vehicle load profile predication LoadV(t) as vehicle load prediction information. The vehicle load profile predication LoadV(t) varies with a time indicated by a clock of the vehicle. The travel route and the pre-air conditioning schedule, which are described previously, can be included in the load profile predication LoadV(t).

The power command center 1A reads the charge request inputted by the user, i.e., the target energy level SOCtarget and the target completion time Schedule, from the HMI information acquisition section 2. The charge request is inputted into the HMI information acquisition section 2 through the input section 224 by a user. The HMI information acquisition section 2 is provided to at least one of the home 100 and the vehicle 200. The power command center 1A reads the charge request each time the charge request is updated. Thus, the power command center 1A can use the latest charge request. According to the embodiment, the target energy level SOCtarget inputted by the user represents a ratio of the amount of power [kWh] to be charged into the battery 210 to the full capacity of the battery 210. Alternatively, the user can input a specific power value [kWh] to be charged into the battery 210 instead of inputting the target energy level SOCtarget. The specific power value corresponds to a target energy power Ecom, which is shown in FIG. 5 and described later. In this case, the target energy level SOCtarget can be calculated as follows: SOCtarget=(inputted power value/battery full capacity)+present battery SOC. In this way, even when the user inputs a value other than the target energy level SOCtarget, the target energy level SOCtarget can be calculated based on the inputted value.

If the charge request is not updated, the power command center 1A uses a default value. The default value can be changed at a predetermined interval (e.g., one week). Alternatively, if the charge request is not updated, the power command center 1A can use the previous charge request. Further, the power command center 1A reads the conversion rating PVImax of each of the primary charger/discharger 150 and the secondary charger/discharger 230. The conversion rating PVI represents a maximum operating power, a maximum operating voltage, and a maximum operating current of each of the primary charger/discharger 150 and the secondary charger/discharger 230.

Then, the power command center 1A creates the charge/discharge plan Pcom(t) based on the above information and commands the primary charger/discharger 150 and the secondary charger/discharger 230 to charge/discharge the battery 210 according to the charge/discharge plan Pcom (t) so that the battery 210 can be charged to the target energy level SOCtarget by the target completion time Schedule.

Although not shown in the drawings, the vehicle load profile predication LoadV(t) is set to the vehicle charge/discharge controller 20, for example, when the travel route and the pre-air conditioning schedule are updated. Likewise, the load profile LoadH(t) is set to the HEMS information acquisition section 10, for example, when an operation schedule of the electric water heater 121 is updated.

A first charge/discharge process executed by the power command center 1A at S130 is described below with reference to FIG. 7.

The first charge/discharge process starts at S1310, where the power command center 1A reads the information (i.e., the battery information, the load profile predication, and the home-side power information) from the HEMS information acquisition section 10 and the vehicle charge/discharge controller 20. Then, the first charge/discharge process proceeds to S1320, where the power command center 1A calculates a present energy Ereal of the battery 210 and a maximum exchangeable power Pmax between the home 100 and the vehicle 200.

The present energy Ereal is calculated by the following equation:

$$Ereal = Efull \times SOC \quad (1)$$

In the equation (1), Efull represents a full capacity of the battery 210 and is in units of kWh. The SOC is included in the battery information and represents the ratio of the present energy Ereal to the full capacity Efull.

A chargeable power Win between the home 100 and the vehicle 200 is given by the following equation:

$$Win = min(WBin, WHout) \quad (2)$$

It is noted that the "min(WBin, WHout)" represents a smaller one of WBin and WHout. That is, the chargeable power Win is given as a smaller one of the vehicle-side chargeable power WBin and the home-side dischargeable power WHout.

A dischargeable power Wout between the home 100 and the vehicle 200 is given by the following equation:

$$Wout=min(WBout, WHin) \quad (3)$$

That is, the dischargeable power Wout is given as a smaller one of the vehicle-side dischargeable power WHout and the home-side chargeable power WHin.

The maximum exchangeable power Pmax is given by the following equation:

$$Pmax=min(Win, Wout) \quad (4)$$

That is, the maximum exchangeable power Pmax is given as a smaller one of the chargeable power Win and the dischargeable power Wout.

Then, the first charge/discharge process proceeds to S1330, where the power command center 1A determines whether the charge request, which is inputted by the user into the HMI information acquisition section 2, is updated. As mentioned previously, the charge request includes the target energy level SOCtarget and the target completion time Schedule. If the change request is updated corresponding to YES at S1330, the first charge/discharge process proceeds to S1340. At S1340, the power command center 1A reads the target energy level SOCtarget and the target completion time Schedule and calculates a charging time Ttimedate as follows:

$$Ttimedata=Schedule-Treal \quad (5)$$

In the equation (5), Treal represents the present time.

Then, the first charge/discharge process proceeds to S1350, where the power command center 1A determines whether the charging time Ttimedate is equal to or greater than an estimated necessary time T in order to determine whether it is possible to charge the battery 210 to the target energy level SOCtarget by the target completion time Schedule.

The estimated necessary time T is calculated as follows:

$$Etarget=Efull \times SOCtarget \quad (6)$$

$$T=(Etarget-Ereal)/Pmax \quad (7)$$

In the equation (6), Etarget represents a minimum target charge amount. It is noted that if the conversion rating of each of the primary charger/discharger 150 and the secondary charger/discharger 230 is smaller than the maximum exchangeable power Pmax, the estimated necessary time T is calculated by substituting the conversion rating into the maximum exchangeable power Pmax in the equation (7).

If the charging time Ttimedate is less than the estimated necessary time T, the power command center 1A determines that it is impossible to charge the battery 210 to the target energy level SOCtarget by the target completion time Schedule, corresponding to NO at S1350, and the first charge/discharge process proceeds to S1360. At S1360, the power command center 1A returns an error to S1330. In contrast, if the charging time Ttimedate is equal to or greater than the estimated necessary time T, the power command center 1A determines that it is possible to charge the battery 210 to the target energy level SOCtarget by the target completion time Schedule, corresponding to YES at S1350, and the first charge/discharge process proceeds to S1380.

If the change request is not updated corresponding to NO at S1330, the first charge/discharge process proceeds to S1370. At S1370, the power command center 1A uses a default target energy level SOCtarget to calculate the minimum target charge value Etarget. For example, the default target energy level SOCtarget can be set to 80%. Alternatively, the power command center 1A can use the previous target energy level SOCtarget to calculate the minimum target charge value Etarget.

At S1380, the power command center 1A calculates a target energy power Ecom as follows:

$$Ecom=Etarget-Ereal \quad (8)$$

Then, the first charge/discharge process proceeds to S1390, where the power command center 1A calculates a dischargeable energy lower limit Emin as follows:

$$EN=Etarget-Pmax \times (Schedule-Treal) \quad (9)$$

$$EL=Efull \times SOC20\% \quad (10)$$

$$Emin=max(EN, EL) \quad (11)$$

In the equation (10), SOC20% represents a minimum SOC level for preventing degradation of the batteries 140, 210. The minimum SOC level is not limited to 20%.

From the equation (11), the dischargeable lower limit Emin is given as a larger one of EN and EL.

Then, the first charge/discharge process proceeds to S1392, where the power command center 1A calculates a chargeable upper limit Emax as follows:

$$Emax=Efull \times SOC90\% \quad (12)$$

In the equation (10), SOC90% represents a maximum SOC level for preventing degradation of the batteries 140, 210. The maximum SOC level is not limited to 90%.

Then, the first charge/discharge process proceeds to S1394, where the power command center 1A creates the charge/discharge plan Pcom(t) within the maximum exchangeable power Pmax, the chargeable energy upper limit Emax, and the dischargeable energy lower limit Emin. For example, the charge/discharge plan Pcom(t) can be created based on the cost profiles C1(t)-Cn(t) and the load profile LoadH(t) so that the battery 210 can be intensively charged at night when electricity is cheaper. For another example, the charge/discharge plan Pcom(t) can be created in such a manner that power generated by the photovoltaic unit 130 of the home 100 is temporarily stored in the battery 210 of the vehicle 200 to use the power later. For another example, the charge/discharge plan Pcom(t) can be created in such a manner that when the load of the home appliance 120 is increased above a power supply capacity of the power supply system 100A, power stored in the battery 210 is supplied to the home 100, and then when the load of the home appliance 120 is reduced below the power supply capacity of the power supply system 100A, the battery 210 is charged.

Then, the first charge/discharge process proceeds to S1396, where the power command center 1A outputs the charge/discharge plan Pcom(t) to the primary charger/discharger 150 and the secondary charger/discharger 230, and the primary charger/discharger 150 and the secondary charger/discharger 230 are controlled based the charge/discharge plan Pcom(t). According to the embodiment, the charge/discharge plan includes a power value Pcom(t) changing with time. Alternatively, the charge/discharge plan can include a voltage value Vcom(t) changing with time or a current value Icom(t) changing with time. The voltage and current of each of the primary charger/discharger 150 and the secondary charger/discharger 230 are monitored and controlled to target values. When the primary charger/discharger 150 and the secondary charger/discharger 230 are fast chargers/dischargers, one of the primary charger/discharger 150 and the secondary charger/discharger 230 is monitored, and the other of the primary charger/discharger 150 and the secondary charger/discharger 230 is controlled In a case of a reverse power flow, i.e., when power is supplied from the vehicle 200 to the home 100, the primary charger/discharger 150 is controlled by monitoring the voltage V, current I, and frequency F of the AC bus. In this case, if the primary charger/discharger 150 is connected to the DC bus, the primary charger/discharger 150 is controlled by monitoring the voltage VB1 and the current IB1 of the DC bus.

Next, a second charge/discharge process executed by the power command center 1A at S140 is described below. As mentioned previously, step S140 is performed when the first mode OM1 is set as the operation mode, and the home 100 is not equipped with the HEMS. In this case, the vehicle ECU 225 serves as the power command center 1A. The second charge/discharge process executed by the power command center 1A at S140 is almost the same as the first charge/discharge process, shown in FIG. 7, executed by the power command center 1A at S130. However, since the home 100 is not equipped with the HEMS, the power command center 1A cannot receive the home-side power information (e.g., cost profiles C1(t)-Cn(t)) from the HEMS information acquisition section 10. Therefore, the power command center 1A creates the charge/discharge plan Pcom(t) by using a default home-side power information. The default home-side power information can be modified through the HMI information acquisition section 2.

Alternatively, at S140, the power command center 1A can immediately start to charge the battery 210 to its full capacity by default. In this case, for example, the power command center 1A can charge the battery 210 at a constant current until the battery 210 is charged to a predetermined SOC level, and then when the battery 210 is charged to the predetermined SOC level, the power command center 1A can charge the battery 210 at a constant voltage.

Figure 8:
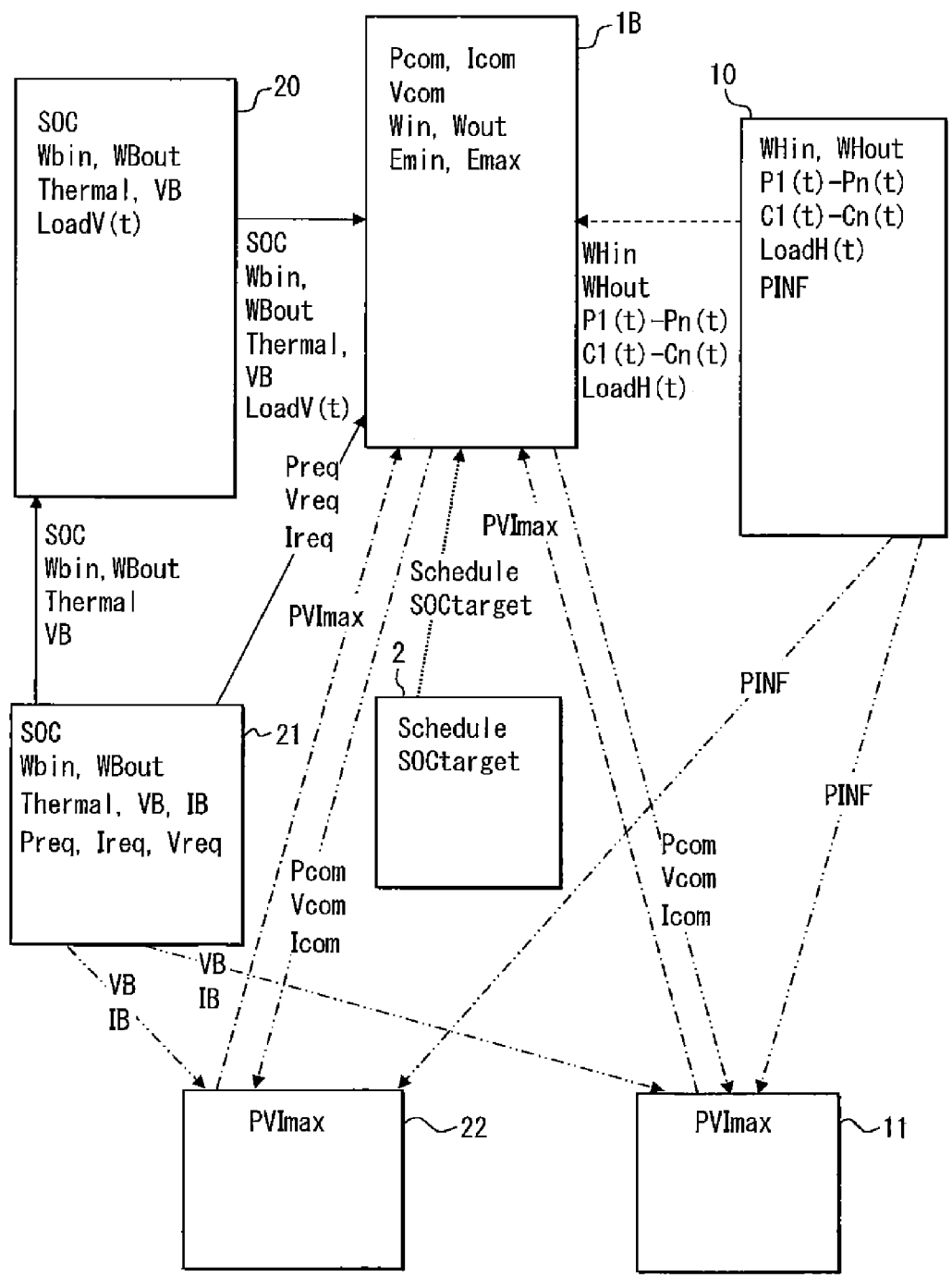
FIG. 8 is a diagram illustrating each function of the home and the vehicle in a second operation mode of FIG. 5.
Figure 9:
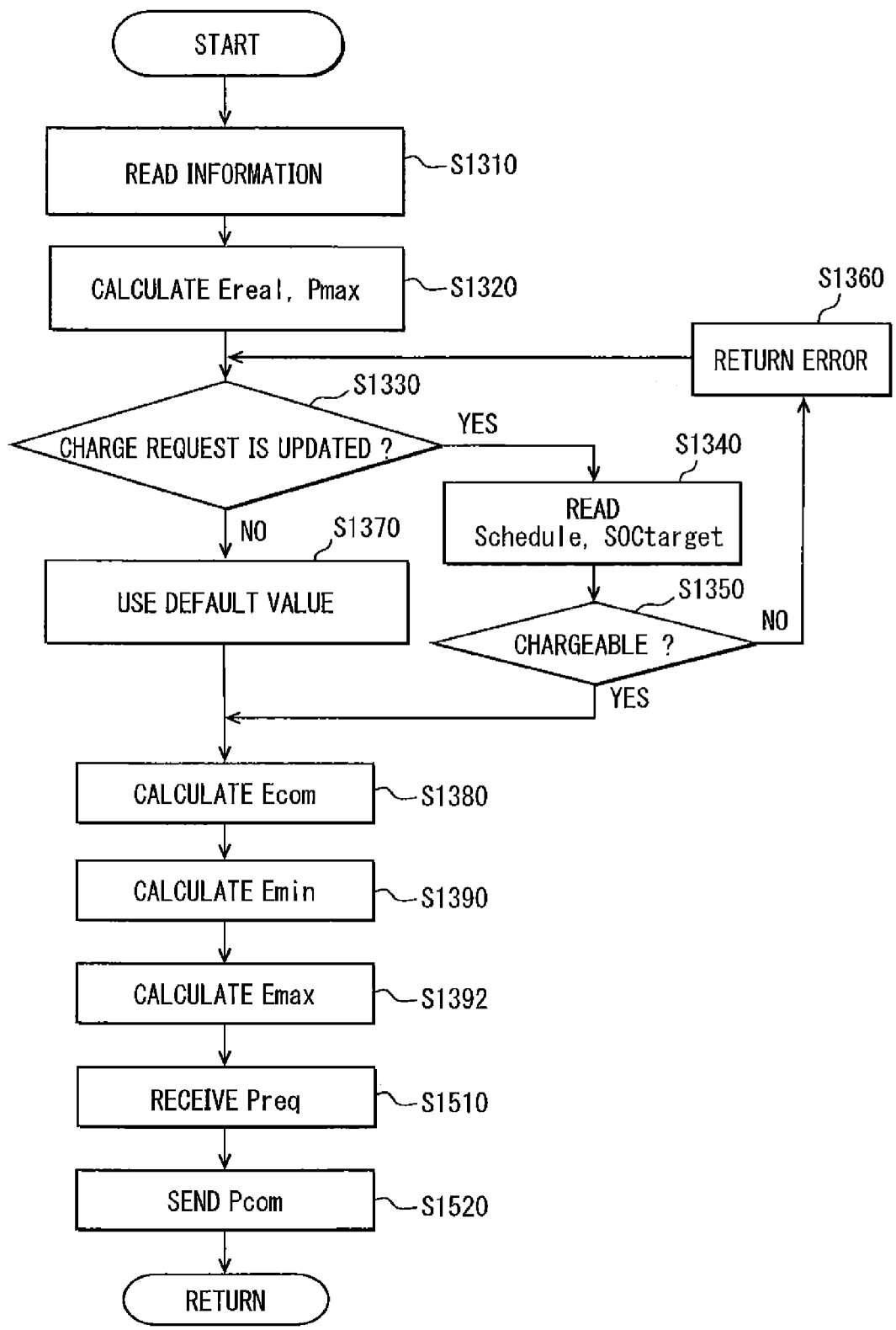
FIG. 9 is a diagram illustrating a process performed at step S150 of FIG. 4.

Finally, step S150 is described with reference to FIGS. 8 and 9. FIG. 8 is a diagram illustrating each function of the home 100 and the vehicle 200 at step S150. FIG. 9 illustrates a third charge/discharge process executed at S150. As mentioned previously, step S150 is executed when the second mode OM2 is set as the operation mode regardless of whether the home 100 is equipped with the HEMS. In this case, the power command center 1B is provided to the vehicle ECU 225.

As can be seen by comparing FIG. 6 and FIG. 8, a difference between FIG. 6 and FIG. 8 is that the power command center 1B receives a direct charge/discharge request Preq, Vreq, or Ireq from the battery information acquisition section 21. The direct charge/discharge request Preq, Vreq, or Ireq are included in the battery information. The direct charge/discharge request Preq represents a power value, the direct charge/discharge request Vreq represents a voltage value, and the direct charge/discharge request Ireq represents a current value. According to the embodiment, it is assumed that the power command center 1B receives the direct charge/discharge request Preq representing a power value.

The battery information acquisition section 21 outputs the direct charge/discharge request Preq to the power command center 1B each time a predetermined condition is met. For example, the battery information acquisition section 21 can have a timer function of measuring time, a counting function of counting the number of times the battery 210 is charged, or an integral function of calculating the integral of power in the battery 210. In this case, the predetermined condition can be met, when the measured time reaches a predetermined time (e.g., one month), when the counted number reaches a predetermined number, or when the calculated integral of power reaches a predetermined value.

As can been seen by comparing FIG. 7 and FIG. 9, a difference between the third charge/discharge process performed at S150 by the power command center 1B and the first charge/discharge process performed at S130 by the power command center 1A is that the third charge/discharge process has step S1510 and S1520 instead of step S1394 and step S1396, respectively.

At S1510, the power command center 1B receives the battery information including the direct charge/discharge request Preq from the battery information acquisition section 21. Then, at S1520, the power command center 1B creates a command power value Pcom based on the direct charge/discharge request Preq within the maximum exchangeable power Pmax, the chargeable energy upper limit Emax, and the dischargeable energy lower limit Emin. When the power command center 1B receives the direct charge/discharge request Vreq or Ireq from the battery information acquisition section 21, the power command center 1B can create a command voltage value Vcom or a command current value Icom. Further, at S1520, the power command center 1B sends the command power value Pcom to the primary charger/discharger 150 and the secondary charger/discharger 230 so that the primary charger/discharger 150 and the secondary charger/discharger 230 can charge the battery 210 at the command power value Pcom. Thus, the battery 210 is charged at a constant power indicated by the command power value Pcom. As described above, the command value sent by the power command center 1B represents a physical value. Instead of the command value, the power command center 1B can send a first flag Reqf indicating a physical value type (i.e., power, voltage, or current) and a second flag ReqValue indicating a value of the physical value type indicated by the first flag Reqf.

That is, the second mode OM2 is used to directly control the charge/discharge condition of the battery 210. Specifically, in the second mode OM2, the present physical value such power (W), voltage (V), or current (A) of the battery 210 is controlled to a target value (i.e., Pcom, Vcom, or Icom). For example, the mode OM2 can be used to charge or discharge the battery 210 at a constant physical value. In contrast, the first mode OM1 is used to charge or discharge the battery 210 to a predetermined level by a predetermined time. Specifically, in the first mode OM1, the integral of power (watt-hour, Wh) charged to the battery 210 by the predetermined time is controlled. Thus, the present physical value such power (W), voltage (V), or current (A) of the battery 210 changes with time based on the charge/discharge plan Pcom(t).

The second mode OM2 can be performed at a regular interval to evaluate performance (e.g., full capacity, degradation degree) of the battery 210. For example, the second mode OM2 can be performed each time a predetermined time is elapsed or the number of time the battery 210 is charged reaches a predetermined number. For example, the battery 210 can be evaluated as follows. Firstly, the battery 210 is fully discharged, and a voltage of the fully discharged battery 210 is set as a zero point (SOC=0%). Then, the battery 210 is fully charged at a constant current. Then, a voltage of the fully charged battery 210 is set as a full point. Then, the present full capacity of the battery 210 is evaluated based on a difference between the zero point and the full point.

As described above, according to the embodiment of the present invention, when the battery 210 is charged to the target energy level SOCtarget by the target completion time Schedule (i.e., when the battery 210 is charged by the target energy power Ecom by the target completion time Schedule), the determination section (S120) of the vehicle ECU 225 determiners whether the home 100 is equipped with the home-side controller 160 (HEMS). Then, the setting section (S130, S140) of the vehicle ECU 225 sets one of the home-side controller 160 and the vehicle ECU 225 as the power command center 1A based on a result of determination by the determination section. Then, the power command center 1A commands one of the primary charger/discharger 150 and the secondary charger/discharger 230 to charge/discharge the battery 210. In such an approach, regardless of whether the home 100 is equipped with the home-side controller 160, the battery 210 of the vehicle 200 can be surely charged by power supplied from the home 100, and power can be supplied form the vehicle 200 to the home 100 as needed.

Specifically, when the battery 210 is charged to the target energy level SOCtarget by the target completion time Schedule (i.e., when the battery 210 is charged by the target energy power Ecom by the target completion time Schedule) under a condition that the home 100 is equipped with the home-side controller 160, the home-side controller 160 serves as the power command center 1A. Thus, a total power exchange control between the power supply system 100A of the home 100 and the battery 210 of the vehicle 200 can be achieved under the initiative of the home-side controller 160.

In contrast, when the battery 210 is charged to the target energy level SOCtarget by the target completion time Schedule (i.e., when the battery 210 is charged by the target energy power Ecom by the target completion time Schedule) under a condition that the home 100 is not equipped with the home-side controller 160, the vehicle ECU 225 serves as the power command center 1A. Thus, a power exchange control between the home 100 and the vehicle 200 can be achieved under the initiative of the vehicle ECU 225.

In the first mode OM1, the power command center 1A receives the charge request including the target energy level SOCtarget and the target completion time Schedule and creates the charge/discharge plan based on the charge request, the battery information, and the home-side information. The power command center 1A commands the one of the primary charger/discharger 150 and the secondary charger/discharger 230 to charge/discharge the battery 210 according to the charge/discharge plan so that the battery 210 can be charged to the target energy level SOCtarget by the target completion time Schedule (i.e., so that the target energy power Ecom can be charged into the battery 210 by the target completion time Schedule). In such an approach, power exchange between the home 100 and the vehicle 200 can be surely achieved. Further, since the charge/discharge plan is created based on the target energy level and the target completion time inputted by a user, the power exchange between the home 100 and the vehicle 200 can be achieved to suit user's needs.

Further, when the battery 210 is charged at a predetermined physical value such as power, voltage, or current, the vehicle ECU 225 is placed in the second mode OM2 and serves as the power command center 1B. The power command center 1B creates the physical value based on the battery information and the home-side information. Then, the power command center 1B commands the one of the primary charger/discharger 150 and the secondary charger/discharger 230 to charge/discharge the battery 210 at the physical value. Thus, the charge/discharge condition of the battery 210 can be directly controlled by the vehicle ECU 225.

Further, the power command center 1A, 1B calculates the maximum exchangeable power, the chargeable/dischargeable energy upper limit, and the chargeable/dischargeable energy lower limit based on the battery information and the home-side information and commands the one of the primary charger/discharger 150 and the secondary charger/discharger 230 to charge/discharge the battery 210 within the maximum exchangeable power, the chargeable/dischargeable energy upper limit, and the chargeable/dischargeable energy lower limit. Thus, the power exchange between the home 100 and the vehicle 200 can be suitably achieved.

Further, the power command center 1A, 1B receives the conversion rating of the one of the primary charger/discharger 150 and the secondary charger/discharger 230 and commands the one of the primary charger/discharger 150 and the secondary charger/discharger 230 to charge/discharge the battery 210 within the conversion rating (PVImax). Thus, the power exchange between the home 100 and the vehicle 200 can be suitably achieved.

Further, when at least one of the battery information, the installation-side information, the vehicle load prediction, and the charge request is unavailable, the power command center 1A, 1B commands the one of the primary charger/discharger 150 and the secondary charger/discharger 230 to charge/discharge the battery 210 based on a predetermined default value. Thus, the power exchange between the home 100 and the vehicle 200 can be achieved.

The 12V-battery 211 can be charged and discharged in the same manner as the battery 210.

(Modifications)

The embodiment described above can be modified in various ways, for example, as follows.

In the embodiment, the power exchange system is used to exchange power between the power supply system 100A of the home 100 and the battery 210 of the vehicle 200. Alternatively, the power exchange system can be used to exchange power between the vehicle 200 and an installation other than a typical home. For example, the power exchange system can be used to exchange power between the vehicle 200 and a charging facility in a parking lot of a shopping center. For another example, the power exchange system can be used to exchange power between the vehicle 200 and a charging pole on a roadside.

In the embodiment, the power supply system 100A supplies commercial utility power. Alternatively, the power supply system 100A can store power, such as generated by a wind power generator or a photovoltaic power generator, in a storage battery and supply the stored power.

The home 100 can be provided with a display for displaying an electric bill (i.e., cost, fee) associated with the exchange of power between the home 100 and the vehicle 200 to a user.

In such an approach, the user can recognize the electric bill and become more eco-conscious.

In the embodiment, the user inputs the charge request to charge the battery 210 through the input section 224 of the vehicle 200. In addition to or instead of the input section 224, the charge request can be inputted by using, for example, a cell phone and a personal computer connected to a network. The charge request can be a new charge request or a modification request for modifying a previously inputted charge request. In such an approach, the charge request can be easily inputted and modified.

Such changes and modifications are to be understood as being within the scope of the present invention as defined by the appended claims.

What is claimed is:

1. A power exchange system for managing an exchange of power between a power supply system provided in an installation and a vehicle-side battery provided in a vehicle, the power exchange system comprising:

an installation-side charger/discharger;

a vehicle-side charger/discharger coupled to the installation-side charger/discharger to exchange the power between the power supply system and the vehicle-side battery; and a vehicle-side controller provided in the vehicle and configured to receive battery information regarding the vehicle-side battery, wherein the vehicle has a determination section configured to determine whether the power supply system is equipped with an installation-side controller that controls power distribution in the power supply system, the vehicle further having a setting section configured to cause one of the installation-side controller and the vehicle-side controller to have a command function based on a result of determination by the determination section, wherein the command function outputs a charge/discharge command to one of the installation-side charger/discharger and the vehicle-side charger/discharger based on the battery information and installation-side power information regarding the power supply system.

2. The power exchange system according to claim 1, wherein when the power supply system is equipped with the installation-side controller, the setting section causes the installation-side controller to have the command function.

3. The power exchange system according to claim 1, wherein when the power supply system is not equipped with the installation-side controller, the setting section causes the vehicle-side controller to have the command function.

4. The power exchange system according to claim 1, wherein a first mode for charging and discharging the vehicle-side battery to a predetermined target level by a predetermined target time and a second mode for charging and discharging the vehicle-side battery with a predetermined charge/discharge command value are used to charge and discharge the vehicle-side battery, in the first mode, the command function receives the target level and the target time from an information acquisition section and creates a charge/discharge plan based on the battery information and the installation-side power information, and the command function outputs a power command, a current command, or a voltage command to the one of the installation-side charger/discharger and the vehicle-side charger/discharger according to the charge/discharge plan.

5. The power exchange system according to claim 1, wherein a first mode for charging and discharging the vehicle-side battery to a predetermined target level by a predetermined target time and a second mode for charging and discharging the vehicle-side battery with a predetermined charge/discharge command value are used to charge and discharge the vehicle-side battery, in the second mode, the command function outputs a power command, a current command, or a voltage command to the one of the installation-side charger/discharger and the vehicle-side charger/discharger based on the battery information and the installation-side power information.

6. The power exchange system according to claim 5, wherein the second mode is used at a regular interval to evaluate performance of the vehicle-side battery.

7. The power exchange system according to claim 1, wherein a maximum exchangeable power, a chargeable/dischargeable energy upper limit, and a chargeable/dischargeable energy lower limit are set based on the battery information and the installation-side power information, and the command function is operated to satisfy the maximum exchangeable power, the chargeable/dischargeable energy upper limit, and the chargeable/dischargeable energy lower limit.

8. The power exchange system according to claim 7, wherein a conversion rating of the one of the installation-side charger/discharger and the vehicle-side charger/discharger is acquired, and the command function is operated to satisfy the conversion rating.

9. The power exchange system according to claim 1, wherein when at least one of the battery information and the installation-side power information is unavailable, the command function outputs the charge/discharge command by using a predetermined default value.

10. The power exchange system according to claim 1, further comprising:

a display section for displaying an electric bill associated with the exchange of power between the power supply system and the vehicle-side battery.

11. The power exchange system according to claim 1, wherein the command function outputs the charge/discharge command based on the battery information, the installation-side power information, and at least one of vehicle load prediction information and charge request information, the vehicle load prediction information indicates a feature load condition of the vehicle, and the charge request is input through an input section by a user to charge the vehicle-side battery.

12. The power exchange system according to claim 11, wherein the charge request is allowed to be inputted through not only the input section but also a cell phone or a personal computer connected to a network.

* * * * *

UNITED STATES PATENT AND TRADEMARK OFFICE
CERTIFICATE OF CORRECTION

PATENT NO. : 8,581,545 B2
APPLICATION NO. : 13/252746
DATED : November 12, 2013
INVENTOR(S) : Kazuyoshi Obayashi et al.

It is certified that error appears in the above-identified patent and that said Letters Patent is hereby corrected as shown below:

Title Page, Item (73) should read

--(73) Assignee: DENSO CORPORATION, Kariya (JP)--.

Signed and Sealed this
Twenty-eighth Day of January, 2014

Michelle K. Lee
*Deputy Director of the United States Patent and Trademark Office*